US010160669B2

(12) United States Patent
Musson

(10) Patent No.: US 10,160,669 B2
(45) Date of Patent: Dec. 25, 2018

(54) METHODS AND DEVICES FOR THE TREATMENT OF FLUIDS

(71) Applicant: GLASS CIRCLE INVESTMENTS PTY LTD, Melbourne, VIC (AU)

(72) Inventor: Andrew Peter Musson, Central Hawkesbay (NZ)

(73) Assignee: GLASS CIRCLE INVESTMENTS PTY LTD, Melbourne (AU)

( * ) Notice: Subject to any disclaimer, the term of this patent is extended or adjusted under 35 U.S.C. 154(b) by 0 days.

(21) Appl. No.: 15/248,943

(22) Filed: Aug. 26, 2016

(65) Prior Publication Data
US 2016/0362314 A1    Dec. 15, 2016

Related U.S. Application Data

(63) Continuation of application No. 13/511,343, filed as application No. PCT/AU2010/001569 on Nov. 23, 2010, now abandoned.
(Continued)

(51) Int. Cl.
*C25B 11/02* (2006.01)
*C02F 1/461* (2006.01)
(Continued)

(52) U.S. Cl.
CPC .......... *C02F 1/46109* (2013.01); *C25B 11/02* (2013.01); *C02F 1/4672* (2013.01);
(Continued)

(58) Field of Classification Search
CPC .. C02F 2001/46152; C02F 2001/46157; C02F 2001/46161; C02F 2001/46166; C25B 11/02; C25B 11/03; C25B 11/035
See application file for complete search history.

(56) References Cited

U.S. PATENT DOCUMENTS 3,488,224 A    1/1970  Craig
5,366,606 A    11/1994 Tarancon
(Continued)

FOREIGN PATENT DOCUMENTS

GB        716622       10/1954
WO     2006115369 A1   11/2006
(Continued)

OTHER PUBLICATIONS

Kuphaldt, T. Lessons in Electric Circuits, vol. I—DC. Chapter 12, section 12.2 "Conductor size." Oct. 18 2006. pp. 411-417 <https://www.allaboutcircuits.com/textbook/direct-current/chpt-12/conductor-size/> (Year: 2006).*
(Continued)

*Primary Examiner* — Steven A. Friday

(57) ABSTRACT

The present invention provides electrodes for transferring a charge comprising a plurality of members for making electrical contact. The electrodes are suitable for treating aqueous, substantially aqueous and nonaqueous fluids including wastewater, solvents and gases. Water maybe treated using the electrodes to provide higher dissolved oxygen or lower levels of contaminants after treatment. Furthermore, the electrodes may be useful in precipitation reactions such as electrowinning methods. The electrodes may also be capable of altering biological characteristics of organisms such as algae and bacteria.

5 Claims, 8 Drawing Sheets
(3 of 8 Drawing Sheet(s) Filed in Color)

Related U.S. Application Data

(60) Provisional application No. 61/263,897, filed on Nov. 24, 2009.

(51) Int. Cl.
  *C02F 1/467*      (2006.01)
  *C02F 3/32*       (2006.01)

(52) U.S. Cl.
  CPC .... *C02F 3/322* (2013.01); *C02F 2001/46152* (2013.01); *C02F 2001/46157* (2013.01); *C02F 2209/40* (2013.01)

(56) References Cited

U.S. PATENT DOCUMENTS

| | | |
|---|---|---|
| 5,538,608 A | 7/1996 | Furuya |
| 5,766,429 A | 6/1998 | Shimamune et al. |
| 5,938,901 A | 8/1999 | Shimamune et al. |
| 6,605,388 B1 | 8/2003 | Goda et al. |
| 6,916,427 B2 | 7/2005 | Roth |
| 7,258,800 B1 | 8/2007 | Herbst |
| 8,641,886 B2 | 2/2014 | Musson |
| 2002/0189936 A1 | 12/2002 | Shimamune |
| 2004/0069621 A1 | 4/2004 | Gestermann et al. |
| 2007/0016125 A1 | 1/2007 | Wong et al. |

FOREIGN PATENT DOCUMENTS

| | | |
|---|---|---|
| WO | 2008098298 A1 | 8/2008 |
| WO | 2010046774 A1 | 4/2010 |

OTHER PUBLICATIONS

International Search Report for PCTIAU201 0/001569, Completed by the Australian Patent Office on Feb. 23, 2011, 3 Pages.

* cited by examiner

METHODS AND DEVICES FOR THE TREATMENT OF FLUIDS

CROSS REFERENCE

This application is a continuation-in-part and claims benefit of U.S. patent application Ser. No. 13/511,343, filed Oct. 4, 2012, which is a 371 application of PCT/AU2010/001569 filed Nov. 23, 2010, which is a non-provisional and claims benefit of U.S. Provisional Application Ser. No. 61/263,897 filed Nov. 24, 2009, the specification(s) of which is/are incorporated herein in their entirety by reference.

FIELD OF THE INVENTION

The present invention relates to electrodes useful in the treatment of fluids such as water and gases. The devices are useful for example in methods of water purification and/or oxygenation, in the precipitation of metals and gases from a solution containing metal ions, and also modulating the growth of microorganisms such as algae and bacteria.

BACKGROUND OF THE INVENTION

Electrodes are produced in a vast array of shapes, configurations and constructions. However, all are essentially adapted to achieve the basic function of providing a potential difference within an electrolyte. It is conventionally considered that a major functionality of an electrode is to donate or receive electrons to or from an electrolyte to which it is exposed. Given these functions, electrodes must be electrically conductive, and are typically fabricated from a metal, graphite or semiconductor material.

The present invention is concerned with electrodes that are useful in methods for the treatment of water to reduce levels of organic compounds, infectious agents, heavy metals and the like. Common water contaminants include arsenic, asbestos, barium, bacteria, cadmium, chloradane, chlorine, chromium, copper Cryptosporidium, cyanide fluoride, Giardia, hydrogen sulphide, manganese, mercury, nitrates, nitrites, PCB, radium, radon, sulphate, toxaphene, trihalomethanes, viruses, volatile organic compounds, and zinc. It is known that certain contaminants in water may be precipitated or otherwise inactivated by the application of electric currents to water however such methods are not without problems.

The application of an electric current may in certain situations improve the quality of water by increasing levels of oxygenation. Such processes typically involve the direct and indirect oxidation of organic or inorganic compounds in aqueous solutions using catalytic electrodes. These processes can be used to lower BOD, COD and TOC in wastewater, or for the elimination of specific organic compounds. COD (Chemical Oxygen Demand) is the total measurement of all chemicals in the water that can be oxidized. TOC (Total Organic Carbon) is the measurement of organic carbon species. BOD (Biochemical Oxygen Demand) measures the amount of food (or organic carbon species) that are capable of oxidation by bacteria.

Traditionally, the electrolytic treatment of water often involves oxidizing organic compounds in an electrochemical cell both directly at the surface of a catalytic electrode and indirectly by oxidizing chemicals in solution. These treatments employ electricity as the main reactant and the addition of other chemicals is not required unless the solution conductivity is extremely low. In some cases the organic compounds can be converted to carbon dioxide and in many other cases to compounds that are more easily treated by biological processes.

The present invention is also concerned with electrodes useful in metallurgy, and particularly electrometallurgical reductive processes to produce pure metals from metallic compounds. One process that is well known in the art of metallurgy is the electro winning of gold. When two electrodes (cathode and anode) are placed in a solution containing gold ions and an electric current is passed between them, the pure metal is deposited on the negative electrode. An electrolyte, and a current density, is generally chosen that gives dense, compact electrodeposits, and some additives could be included in the electrolyte to further improve product quality. Usually cathodes used in the electro winning of gold are composed of steel wool and the anodes are stainless steel. Typically, the steel wool cathodes become fouled readily.

The electrolysis of water to produce hydrogen and oxygen is also an economically important process utilizing electrode technology. Other applications of electrolytic processes include the production of chlorine, sodium hydroxide, sodium chlorate, potassium chlorate and trifluoroacetic acid. In these applications, electrodes are typically of a basic rod or plate geometry.

Electrodes may also be used to apply electric fields to microorganisms such as algae for the purpose of altering biological characteristics such as permeability, buoyancy and growth rates. The growth of algae on an industrial scale is of significant economic importance in the production of commodities such as animal feed and biofuels.

While the above processes are driven by the application of an electric potential across the anode and cathode of the electrolytic process, the present invention is also concerned with electrodes used without directly applying a current to the electrolytic circuit. For example, a low current potential difference can drive additional ionic electron exchanges.

Methods and systems utilizing electrodes of the prior art have a number of problems, manifesting in the form of inefficiencies and relatively high power requirements. Relevant to those problems it has been estimated that around 4% of all electricity consumed in the United States goes toward the treatment of water. A large proportion of this energy is consumed in the aeration and reticulation of water. Further problems in the prior art include slow reaction rates, low yields of desired products, high levels of undesirable by products, insufficient extent of reaction, electrode fouling, and the like. It is an aspect of the present invention to overcome or alleviate one or more of the problems of the prior art to provide an improved electrode apparatus, and also methods and systems utilizing the improved electrodes.

A reference herein to a patent document or other matter which is given as prior art is not to be taken as an admission that that document or matter was known or that the information it contains was part of the common general knowledge as at the priority date of any of the claims.

Any feature or combination of features described herein are included within the scope of the present invention provided that the features included in any such combination are not mutually inconsistent as will he apparent from the context, this specification, and the knowledge of one of ordinary skill in the art. Additional advantages and aspects of the present invention are apparent in the following detailed description and claims.

SUMMARY OF THE INVENTION

In a first aspect the present invention provides an electrode for transferring a charge comprising a plurality of members for making electrical contact. Applicant has found that electrodes having these features provide advantages in terms of cost of production, cost of maintenance and also performance. In one embodiment of the electrode, at least one of the members exhibits a triangular or pyramidal geometry, with some embodiments exhibiting isosceles geometry. The angle formed by the wall(s) of the pointed member that form the point may be greater than 0 degrees. In one embodiment, the electrode is suitable for use with an electrolyte.

At least one of the plurality of n embers may be a projection or a pointed element. At least one of the members may exhibit a triangular or pyramidal geometry, and optionally isosceles geometry. In one preferred embodiment, an electrically conductive sheet material is cut into a plurality of tabs of regular morphology to form a plurality of members. Each of the member tapers towards an end and terminates to a tip or a point or an apex to form a triangle with the apex of the triangle having a low cross-sectional area across a plane. Since the apex of the two dimensional triangular members have low cross-sectional area, the apex have intense electrokinetic activity and the base of the triangular members (with higher surface area) have low electrokinetic activity. As a result, the electrolyte flows continuously from the base of the triangular members toward the apex creating a steep electric field gradient which in turn excites electron or other species in this gradient. This flux results in the production of radicals/oxidized species although short lived.

In one form of this embodiment, the angle formed by at least one side of at least one member to another side is greater than 0 degrees, but less than about 40, optionally 30, optionally 20, optionally 10, or optionally 5 degrees.

The electrode may comprise at least about 4, 6, 8, 10, 12, 14, 18, 18, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10000 members.

In another form of the invention the electrode comprises less than about $10^{20}$, $10^{19}$, $10^{18}$, $10^{17}$, $10^{16}$, $10^{15}$, $10^{14}$, $10^{13}$, $10^{12}$, $10^{11}$, $10^{10}$, $10^9$, $10^8$, $10^7$, $10^6$, $10^5$, $10^4$, or $10^3$ members.

The electrode may be adapted or configured such that, in use with a fluid, at least one of the members is substantially directed in one or more of (s) a generally upward direction, or (ii) in the general direction of fluid flow about the electrode, or (iii) a generally sideward direction, or (iv) generally across liquid flow about the electrode.

The electrode may comprise a housing, which in some forms of the invention is capable of directing, containing or collecting a fluid, liquid, gas or solid; and/or directing and/or concentrating a gradient; and/or for insulating a portion of the electrode. The electrode may further comprise means for receiving a fluid or gas (and optionally a gas diffusing means), and may be associated with, or integral to, an airlift pump. The fluid or gas may be reactive.

The electrode according may comprise an electrical conduit, or means for connecting an electrical conduit. The electrode may further comprise a substantially spherical body disposed on or around a point of a member.

In another aspect, the present invention provides an array of electrodes as described herein.

Yet a further aspect of the present invention provides a method of manufacturing an electrode, the method comprising the steps of providing an electrically conductive sheet material, cutting the sheet material to provide a plurality of tabs, and directing the tabs so the tabs are directed above or below the plane of the conductive sheet material to provide a plurality of members.

In another aspect of the present invention there is provided a fluid treatment method, the method comprising the steps of providing a fluid in need of treatment, and exposing the fluid to an electrode described herein for a period of time and under conditions suitable for at least partial treatment of the fluid. The method may comprise the further step of treating the fluid with a second method selected from the group consisting of filtration, ultrafiltration, sedimentation, activated sludge treatment, ultraviolet light illumination, ozonation, chlorination, fluoridation, reverse osmosis, distillation, acidification, alkalization, coagulation, flocculation, electrodeionization, dialysis, and electrodialysis. In one embodiment of the method, the fluid is waste water.

A further aspect of the present invention provides a method for altering biological characteristics of an organism in an aqueous solution, the method comprising the steps of providing an organism in an aqueous solution, and exposing the organism to an electrode described herein for a period of time and under conditions suitable for altering the biological characteristic. The biological characteristics may be growth, viability, the ability to reproduce, the regulation of the cell cycle, the ability to assimilate a nutrient, the integrity or permeability of a membrane or wall of a cell of the organism, buoyancy or motility.

Still a further aspect of the present invention provides a precipitation method, comprising the steps of providing a fluid containing the species to be precipitated, and exposing the fluid to an electrode as described herein for a period of time and under conditions suitable for the complete or partial precipitation of the species, wherein the species to be precipitated is an ionic species or a gas In one form of the method the electrode comprises a spherical body.

In another aspect the present invention provides a method for altering a biological characteristic of an organism in non-aqueous solution. The method comprises the steps of exposing the organism to an electrode as described herein for a period of time and under conditions suitable for altering the biological characteristic.

In a further aspect the present invention provides a system for treating a liquid or gas comprising use of an electrode as described herein, or an array as described herein, or a method as described herein.

Throughout the description and the claims of this specification the word "comprise" and variations of the word, such as "comprising" and "comprises" is not intended to exclude other additives, components, integers or steps.

One of the unique and inventive technical features of the present invention is that the triangular electrode member tapers towards an end and terminates to a point or an apex to form an isosceles triangle with the apex having a low cross-sectional area of less than that of a wire of gauge of about 0000000. Without wishing to limit the invention to any theory or mechanism, it is believed that the technical feature of the present invention advantageously provides for the apex of the triangular members having intense electrokinetic activity and the base of the triangular members (with higher surface area) having low electrokinetic activity. Therefore, when the triangular electrode members are in contact with electrolyte, the electrolyte flows continuously from the base of the triangular members toward the apex creating a steep electric field gradient which in turn excites electron or other species in this gradient as opposed to a projection having apex or other protrusions with high cross-sectional area. None of the presently known prior references or work has the unique inventive technical feature of the present invention.

BRIEF DESCRIPTION OF THE DRAWINGS

This patent application contains at least one drawing executed in color. Copies of this patent or patent application publication with color drawing will be provided by the Office upon request and payment of the necessary fee.

The features and advantages of the present invention will become apparent from a consideration of the following detailed description presented in connection with the accompanying drawings in which.

DESCRIPTION OF PREFERRED EMBODIMENTS

Figure 1A:
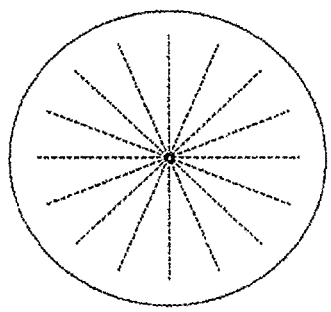
FIGS. 1A-1F shows a number of cutting templates useful in the construction of an electrode from sheet metal. The template of FIG. 1A was used for construction of the electrode in FIG. 2.
Figure 1B:
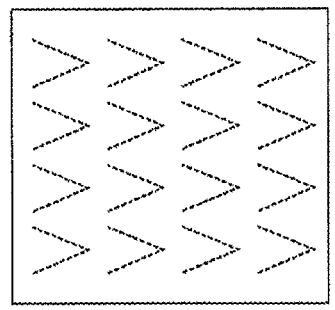
Figure 1C:
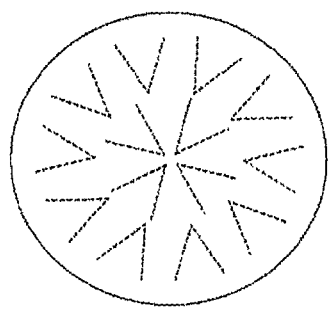
Figure 1D:
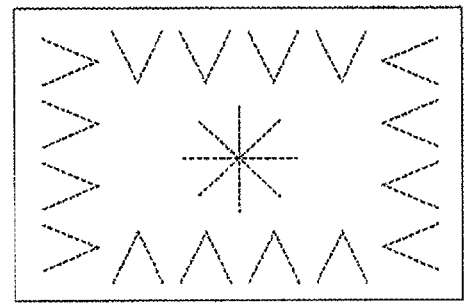
Figure 1E:
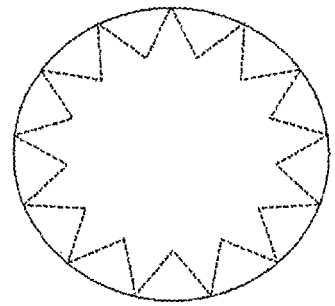
Figure 1F:
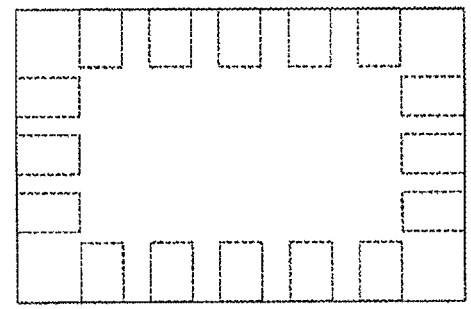

Referring now to FIGS. 1-8, a first aspect the present invention provides an electrode for transferring a charge comprising a plurality of members for making electrical contact. Without wishing to be limited by theory in any way. Applicant proposes that the member is the part of the electrode that is responsible for the greatest current flow due to ions (as distinct from electrons), with the area around the members proposed to be an area of very intense electrokinetic activity. It is thought that this increased activity is mainly due to the electrokinetic activity of ions as a result of increased electric field gradients created by the shape of the members.

irrespective of the proposed mechanistic aspects of the invention, Applicant has discovered a relationship between the number of members and various electrochemical parameters. Applicant further proposes that the geometry of the members may also affect various electrochemical parameters As shown in Example 2 herein increasing the number of members has a proportional relationship to dissolved oxygen levels in the treatment of water. The level of dissolved oxygen in water is indicative of the ability of the water to not only support life, but also the ability to inactivate or neutralize organic and inorganic contaminant molecules. The oxidation of contaminant molecules may be either direct or indirect. Direct oxidation occurs as a result of the interaction of the contaminant molecule at an electrode of the electrolytic circuit. By contrast, indirect oxidation is caused by contact of the contaminant with reactive oxygen species in the water, these species generated directly from the electrolytic process. The ability to increase dissolved levels of other gases may be similarly improved, in different electrolytes and with different input gases.

As used herein, the term "electrode" is to be taken in its ordinary meaning, and does not extend to any object or contrivance capable of conducting an electric current. For example, many common objects composed of a conductive material could be considered to have electrode-like functions, but would never be useful or used as an electrode in an electrolytic process. Such objects that are not purpose-built electrodes are excluded from the scope of this application. Similarly, many common metal objects such as automotive parts and architectural hardware are subjected to electroplating methods and effectively act as an electrode in a circuit. Again, such objects are excluded from the scope of the term "electrode" as used in the context of the present invention. Preferred features of purpose-built electrodes are discussed further herein infra.

It will he understood that the present electrodes are distinguished from known "high surface area" electrodes of the prior art. Such electrodes typically exhibit a convoluted surface, or a coating (such as an oxide, or diamond particles) that dramatically increase surface area. High surface area electrodes of the prior art may also be manufactured by creating surface features on the electrode, effectively making the surface more convoluted or rough. Such features on an electrode surface can be achieved by the use of abrasives, chemical etching or laser etching for example. These surface features are not considered "members" for the purposes of the present application. Such surface features are amorphous in shape rendering these features essentially ineffective as "members" for the purposes of the present invention.

Each of the plurality of members may be identical or at least similar in terms of geometry and size, however electrodes comprising members of varying geometries and sizes are not excluded from the scope of the present invention. The members typically form only a portion of the electrode, but may also comprise the entire electrode structure.

Each of the plurality of members may be electrically connected simply by way of unitary construction, or may be fabricated separately, but connected electrically by conduit such as wire or cable.

The member may be integral or non-integral to the remaining portion of the electrode. A non-integral member may be screwed, welded, or soldered to the remaining portion of the electrode. More typically, the member will be integral, and formed during manufacture of the electrode.

In one embodiment of the electrode, the member exhibits substantially regular morphology. As used herein, the term "regular morphology" is intended to exclude shapes that comprise a ragged, curved, or undulating edge. In another embodiment of the electrode the distal portion of the member is substantially or exactly symmetrical, in yet a further form of the electrode, the distal portion of the member exhibits a substantially regular morphology and is substantially or exactly symmetrical. Without wishing to be limited by theory it is proposed that a more even (and therefore more effective) voltage gradient is generated about the point of the member where the distal portion of the member exhibits a regular morphology and/or is substantially or exactly symmetrical.

In certain forms of the electrode, the member is substantially elongated in that the length of the element is greater than width, whereby the length is the measurement from base to the most distal point and the width is the measurement across the base, The base is taken as the line traversing the member at the widest level of the element.

In some embodiments of the electrode, at least one of the plurality of members is a projection. As used herein, the term "projection" is intended to mean any member that extends from a main or central part of the electrode, in use, a projection will be substantially surrounded by a fluid electrolyte.

The member or projection may have walls or sides that are substantially parallel or non-parallel. Irrespective of whether the walls or sides are parallel or non-parallel, in one embodiment of the electrode, the member or projection terminates in a tip of low cross-sectional area, it is proposed that projections or members having fine tips result in the increased electrokinetic activity referred to supra. For example, a member or projection may be substantially cylindrical, and be of low cross-sectional area for the entire length of the member or projection.

In a further embodiment of the electrode, at least one of the plurality of members is a pointed element. For the purposes of the present invention, the term "pointed" is intended to mean that the element rises to an apex or vertex formed by a side, or by sides, of the member. For example, where the electrode is formed from a sheet metal material, the pointed element could be considered to be an essentially two dimensional triangle. In some preferred embodiments, each of the two dimensional triangle member tapers towards an end and terminates to a tip or a point or an apex to form a two dimensional triangle (isosceles triangle). According to some embodiments, each of the member may be identical or at least similar in terms of geometry and size. In some embodiments, the apex of the triangle has a low cross-sectional area across the plane A as disclosed in FIG. 7 of the present invention. Member with an apex of low cross-sectional area does not exhibit a convoluted surface or a coating (such as an oxide, or diamond particles) that dramatically increase surface area effectively making the surface more convoluted or rough. Since the apex of the two dimensional triangular members have low cross-sectional area, the apex have intense electrokinetic activity and the base of the triangular members (with higher surface area) have low electrokinetic activity. Therefore, when the triangular electrode members are in contact with electrolyte, the electrolyte flows continuously from the base of the triangular members toward the apex creating a steep electric field gradient which in turn excites electron or other species in this gradient as opposed to a projection having apex or other protrusions with high cross-sectional area. This flux results in the production of radicals/oxidized species albeit short lived.

The cross-sectional area at the tip of the member or projection, may be approximated by reference to the Standard Wire Gauge, By that scale, in one form of the invention the cross-sectional area at the tip is less than that of a wire of gauge about 0000000, 000000, 00000, 0000, 000, 00, 0, 1, 2, 3, 4, 5, 6, 7, 8, 9, 10, 11, 12, 13, 14, 15, 18, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments, the low cross-sectional area of the apex is less than that of a wire of gauge of about 0000000.

Alternatively, the cross-sectional area at the tip may be characterized by reference to a diameter of the member or projection, or by reference to a width of the member or projection. In one form of the invention, the cross-sectional area of the tip is less than that of a cylinder having a diameter of less than about 10, 20, 30, 40, 50, 80, 70, 80, 90, 100, 150, 200, 250, 300, 350, 400, 450, 500, 550, 800, 850, 700, 750, 800, 850, 900, 950 or 1000 µm.

Figure 2:
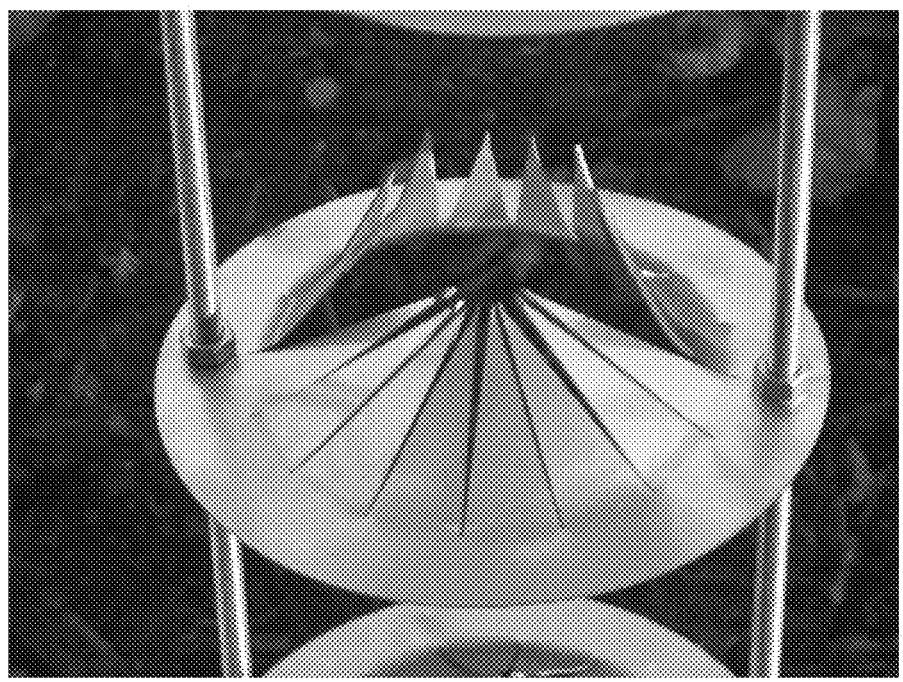
FIG. 2 shows a photograph of an electrode having 16 members, manufactured using sheet metal and the cutting template disclosed in FIG. 1A. The foremost 8 members have not been deformed to their full extent, while the remaining members are substantially deformed such that the points of the members are directed generally upwards. It will be noted that the electrode is part of an array with further electrodes being disposed above and below. In use, liquid for treatment would flow from the bottom of the drawing to the top.
Figure 5:
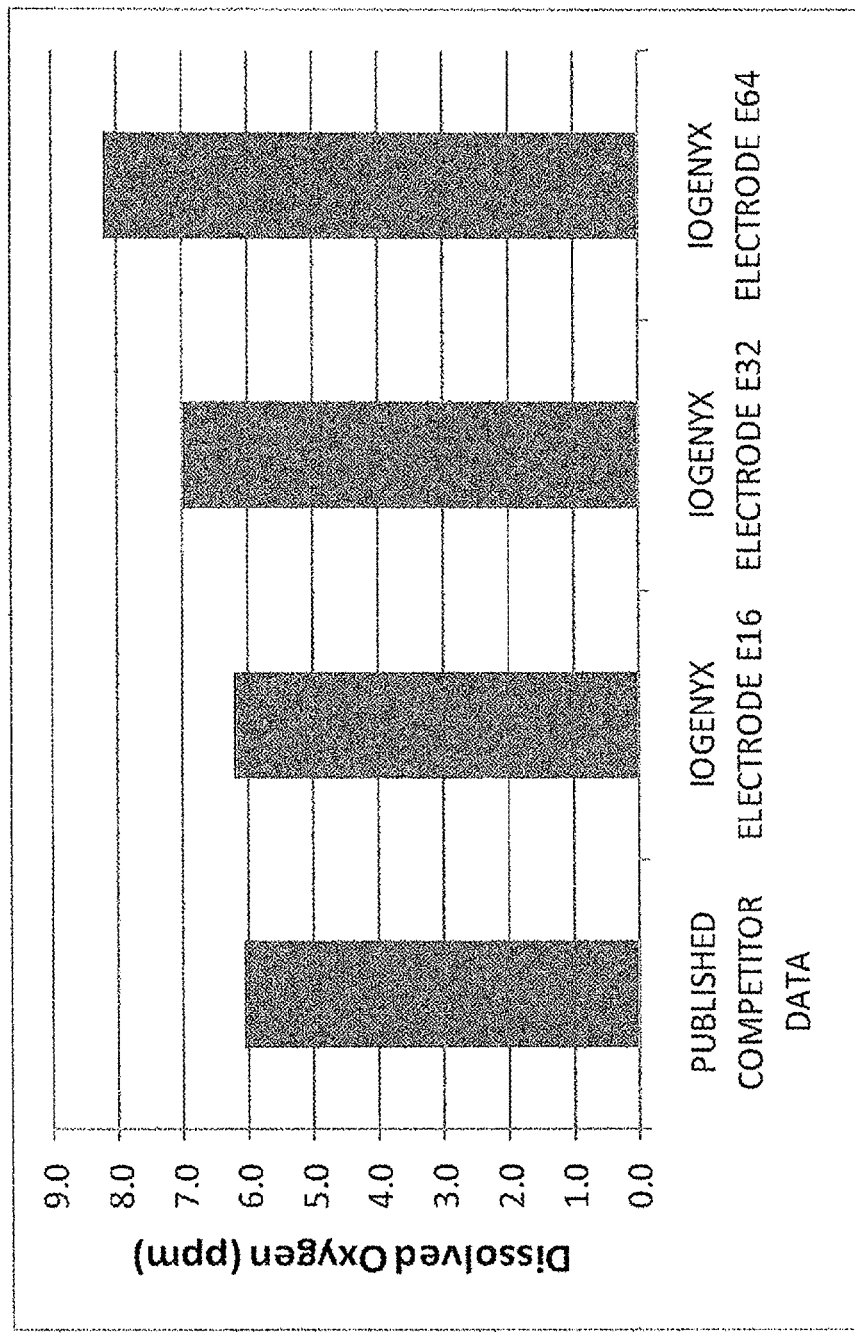
FIG. 5 shows a graph comparing achievable dissolved oxygen with standard commercially available systems with an electrode-based water treatment method using an electrode of the present invention. logenyx Electrodes E16, E32, and E64 are inventive embodiments of the present invention, "Published competitor data" refers to an industry standard system.
Figure 6:
FIG. 6 shows an algal growth in waste water treatment tank, the water treated with an electrode-based treatment method.
Figure 7:
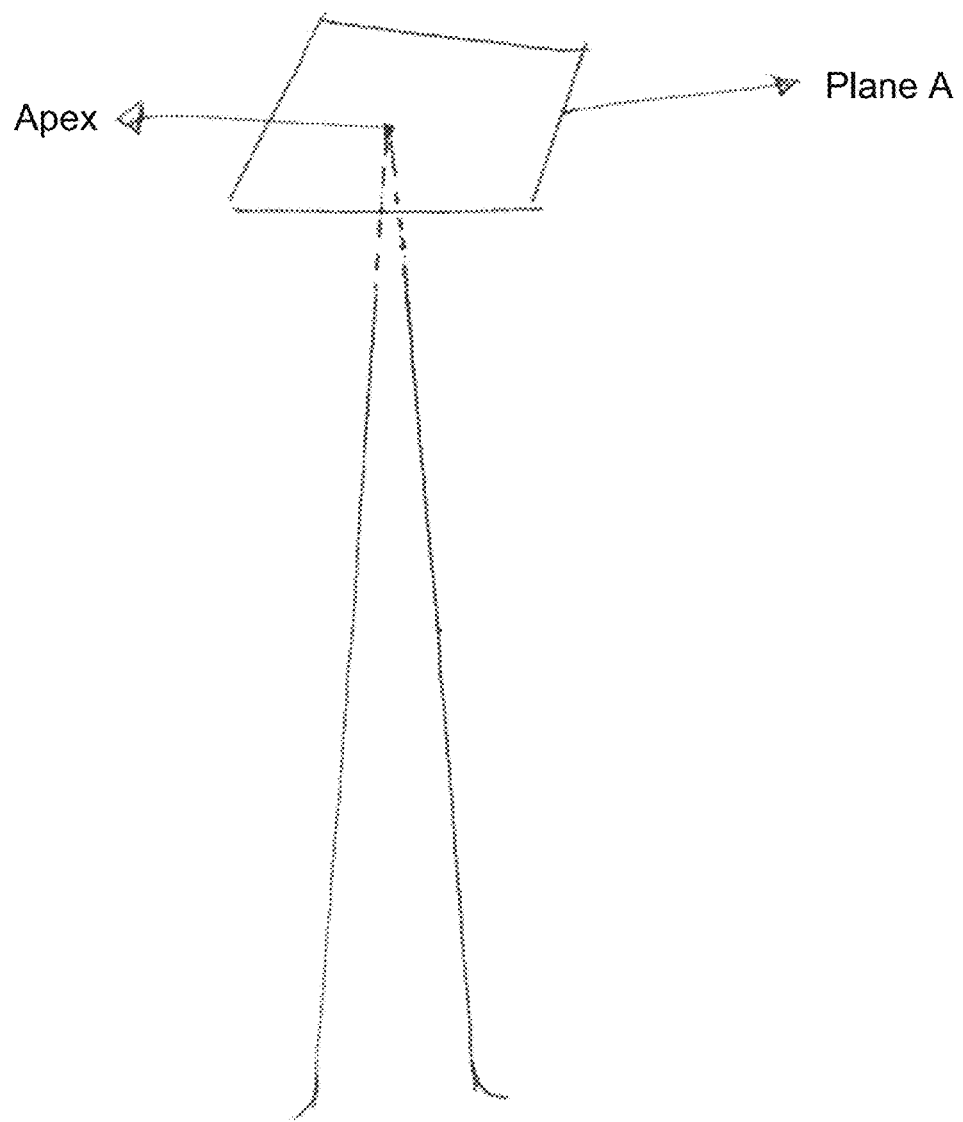
FIG. 7 shows a perspective view of a member of electrode manufactured using sheet metal and the cutting template disclosed in FIGS. 1 and 2. The apex of the member has a low cross-sectional area across the plane A.
Figure 8:
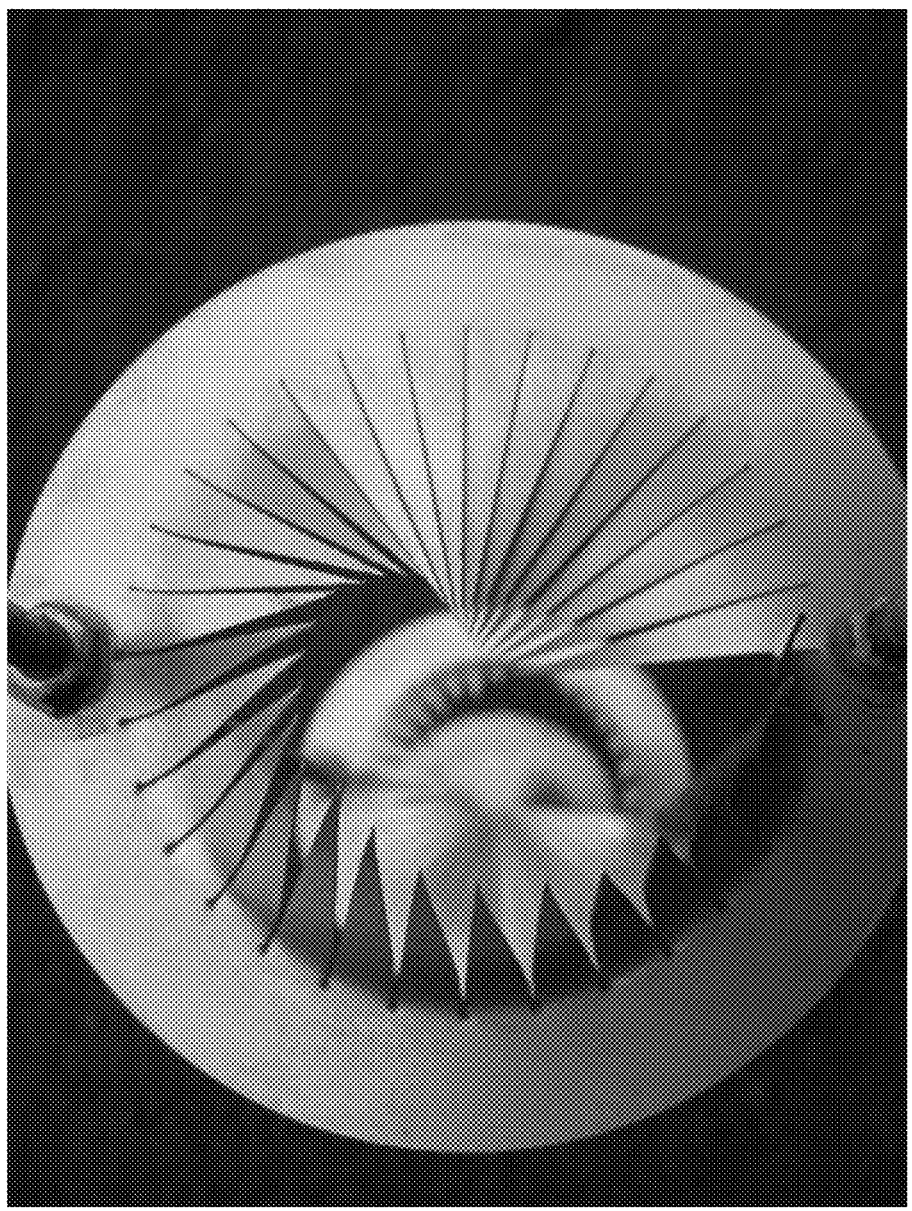
FIG. 8 shows a photograph of an electrode having 32 members, manufactured using sheet metal and the cutting template disclosed in FIG. 1A. The foremost 16 members have not been deformed to their full extent, while the remaining members are substantially deformed such that the points of the members are directed generally upwards. It will be noted that the electrode is part of an array with further electrodes being disposed above and below. In use, liquid for treatment would flow from the bottom of the drawing to the top.

In one preferred embodiment, an electrically conductive sheet material is cut into a plurality of tabs of regular morphology to form a plurality of members. Each of the member tapers towards an end and terminates to a tip or a point or an apex to form a two dimensional triangle with the apex of the triangle having a low cross-sectional area. By definition, apex of a triangle is the vertex where the two sides of equal length meet, opposite to the unequal third side. The feature of the electrode member as a two dimensional triangle with the apex having a low cross-sectional area (across plane A, FIG. 7) is uniquely different over Shimaune prior art (U.S. Patent Application Publication No. US 2002/0189936 A1). As shown in FIGS. 2 and 5-6 of Shimaune prior art, the electrode members are shaped as belts or preferably squares (Para [0009], line 1-2) on which plural number of current collector members (3) are arranged. To the current collector members, resilient means (4) are arranged in the shapes of U or V shaped springs, ribs or louvers with much higher cross-sectional area as compared to the present invention. Shimaune prior art does not demonstrate that the shape of the electrode generates a steep electric field gradients from bottom to top with intense electrokinetic activity at the point or apex of the electrode as disclosed in the presently claimed invention. Moreover, Shimaune prior art is about a full cell reduction cell for producing metal hydroxide and the present invention is about a half cell electrolytic electrode, specifically a cathode. Therefore, they are fundamentally different.

Similarly, Musson prior art (WIPO Publication No. 2008/098298) does not have the feature of the electrically conductive sheet material being cut into a plurality of tabs of regular morphology to form a plurality of members with tapering sides terminate to a tip or a point or an apex to form a two dimensional triangle with the apex having a low cross-sectional area as shown in FIG. 2 of the present invention. Musson prior art discloses in FIG. 2, a cylindrical electrode of the full cell with rod shaped cathode and anode electrodes to establish an electrical field in the aqueous solution which does not have the pointed low cross-sectional area as disclosed in the presently claimed invention. In Musson prior art, the level of dissolved oxygen produced by the electrolysis process facilitates the supersaturation of the water with dissolved oxygen. Musson prior art does not disclose that the shape of the electrode generates a steep electric field gradients from bottom to top with intense electrokinetic activity at the point or apex of the electrode as disclosed in the presently claimed invention. Moreover, the present invention is about water flow over a cathode alone and it acts as a half cell unlike Musson prior art.

Similarly, Furuya prior art (U.S. Pat. No. 5,538,608) disclosed electrodes with either triangular pyramidal (15) or needle-like projections (22) in FIG. 11 and FIG. 13 which do not taper towards an end or terminates to an apex to form a two dimensional triangle with the apex having a low cross-sectional area of less than that of a wire of gauge of about 0000000. Furuya prior art does not disclose that the shapes of the electrode generate a steep electric field gradients from bottom to top with intense electrokinetic activity at the point or apex of the electrode as disclosed in the presently claimed invention.

In a further embodiment of the electrodes of the present invention, where the pointed element has a more significant volume, the geometry of pointed element may have a pyramidal or conical geometry. The pyramidal geometry may be described by a base of 3, 4, 8, 7, 8, 9, 10, 11 or 12 sides such that the pointed element has 3, 4, 5, 6, 7, 8, 9, 10, 11 or 12 faces that converge to a single point. For the purposes of simplicity of manufacture, pyramidal geometries of bases having 4 sides are preferred.

In those embodiments comprising a pointed element, performance of the electrode may vary according to the angle and/or geometry formed by the wall(s) of the pointed element that form the point. The angle may be any angle less than 180 degrees but greater than 0 degrees. However, in a preferred form of the invention, the point of the pointed element forms an angle of less than about 90 degrees but greater than 0 degrees. More preferably the point of the pointed element forms an angle of less than about 85, 80, 75, 70, 65, 60, 55, 50, 45, 40, 35, 30, 25, 20, 15, 10, 5, or 2.5 degrees but greater than 0 degrees. In a highly preferred form of the invention, the point of the pointed element forms an angle of greater than 0 degrees, but less than about 5 degrees.

As used herein, the term "element" includes any, raised portion, extrusion, protuberance, or extension that is capable of making electrical contact with an electrolyte. The element may be shaped or configured such that the electrolyte is capable of surrounding and contacting the surface(s) of the member that form the point.

Indeed, the entirety of the conductive material of the electrode may constitute a pointed element. However, more typically the element will comprise less than all of the conductive material, with at least some material of the electrode comprising the body of the electrode.

It will be understood that a pointed element need not be a projection as defined herein, and may simply be formed by a corner or edge of the electrode. In some embodiments on the electrode, the pointed element is also a projection.

In certain embodiments of the electrode the distal portion of the pointed element exhibits a substantially triangular geometry. Where the pointed element is essentially two dimensional (such as where the element is formed from a sheet material), the triangle may be of any geometry. However, in certain embodiments of the electrode, the triangle is an isosceles triangle. Even more preferably, the isosceles triangle exhibits a height greater than the width of the base. Particularly preferred ratios of height to base include ratios greater than 1.1:1, 1.5,:1, 2:1, 3:1 4:1, 5:1, 6:1, 7:1, 8:1, 9:1, 10:1 111, 12:1 13:1, 14:1, 15:1, 18:1 17:1, 18:1, 19:1, 20:1, 25:1, 30:1, 35:1, 40:1, 45:1 and 50:1

Where the pointed element has a more substantial volume (for example, having three significant dimensions) then a triangle (and preferably an isosceles triangle) may be formed by an imaginary plane bisecting the pointed element. For example, where the pointed element is pyramidal the triangle may be formed by a plane exactly bisecting the pointed element extending from the point to the base. Similarly, where the pointed element is conical, a triangle may be formed by a plane exactly bisecting the pointed element through the point to the base of the cone The electrode may have any number of members, however preferred forms of the invention provide electrodes comprising at least about 4, 8, 8, 10, 12, 14, 18, 18, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10000 members. In other forms of the invention, the electrode comprises less than about $10^{20}$, $10^{19}$, $10^{18}$, $10^{17}$, $10^{16}$, $10^{15}$, $10^{14}10^{13}$, $10^{12}$, $10^{11}$, $10^9$, $10^8$, $10^7$, $10^6$, $10^5$, $10^4$, or $10^3$ members.

The skilled person understands that the term "point" in the context of a "pointed element" is not intended to he considered on an atomic scale given that normal manufacturing methods are incapable of such precision. Thus, the "point" may comprise flattened, rounded or bevelled sections. The cross-sectional area at the point of a pointed element may be approximated by reference to the Standard Wire Gauge. By that scale, in one form of the invention the cross-sectional area at the point is less than that of a wire of gauge about 0000000, 000000, 00000, 0000, 000, 00, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Alternatively, the cross-sectional area at the point may be characterized by reference to a diameter of the point, or by reference to a width of the point, in one form of the invention, the cross-sectional area of the point is less than that of a cylinder having a diameter of less than about 10, 20, 30, 40, 50, 60, 70, 80, 90, 100, 150, 200, 250, 300, 350, 400, 450. 500, 550, 600, 650, 700, 750, 800, 850, 900, 950 or 1000 pm.

Provided with the teachings of the present specification the skilled person is enabled to decide an appropriate number of members for any given application. Generally, an electrode comprising a greater number of members provides a greater effect, however the ability to control the morphology and symmetry of the members can become difficult where the size of the members is small, as will typically be required for electrodes having very large numbers of members. The skilled person is capable of trialling electrodes having varying numbers of members to identify a useful device for a given application.

In one embodiment of the electrode, the device is adapted or configured such that, in use with a fluid, at least one of the members is substantially directed in one or more of (i) a generally upward direction, or (is) in the general direction of fluid flow about the electrode, or (iii) a generally sideways direction, or (iv) generally across liquid flow about the electrode. Without wishing to be limited by theory in any way, it is proposed that an area immediately around the member is an area of increased electrokinetic activity. An area of very high electrokinetic activity is proposed to be present immediately above the member. While preferred, it will be understood that not all members of the electrode must be oriented as described supra. For example, advantages of the present invention may also he achievable where only at least about 10%, 20%, 30%, 40%, 50%, 60%, 70%, 80%, or 90% of members are so oriented.

The adaption or configuration of the electrode to achieve the directional flow requirements described supra may be provided, for example, by the appropriate positioning of any mounting means on the device. Such mounting means will allow for the device to be attached to a wall, floor, ceiling or any other fixed structure in or on an electrolytic reaction cell to achieve the desired direction of liquid or gas flow relative to the member. For example, the electrode may be fitted with mounting means on a lower part of the device (i.e. distal to a point of a member) such that upon mounting to the floor or lower wall of an electrolytic cell, the members are directed substantially upwards.

In one embodiment of the electrode, the electrode comprises a housing. The housing may be for any purpose including directing, containing or collecting a liquid, gas or solid; or for insulating a portion of the electrode.

In one embodiment of the invention, the electrode comprises means for receiving a reactive fluid or gas. Typically, where the electrode comprises a housing, the means is a gas or liquid inlet port in a wall of the housing. The means may further comprise a gas or liquid conduit, such as a flexible pipe or tube capable of connection to a pump or a compressed gas supply. The gas may be any gas that is useful in the context of the invention, but is preferably air or other oxidizing gas.

In another embodiment, the electrode comprises means for connecting an electrical conduit, such as a wire or cable. The means may be any appropriate means including any male electrical connection, any female electrical connection, or a threaded portion. In another embodiment, an electrical conduit is integral with the electrode, being cast or otherwise manufactured in situ with the electrode.

in one form of the invention, the electrode is associated with, or integral to, an airlift pump. Airlift pumps are known in the art of water treatment and handling, and comprise in their simplest form a tube having a lower water inlet, an upper water outlet, and an air inlet in the region of the water inlet. The water inlet portion of the tube is placed in the water, and air is pumped about the inlet causing aerated water to rise toward the outlet where it is expelled. Thus, airlift pumps may be used to aerate and transport water concurrently.

As will be apparent, an electrode according to the present invention may be adapted for use with an airlift pump. For example, an electrode as shown herein may be disposed above the water inlet within the tube of an airlift pump, with the members of the electrode directed upwards such that upon injection of compressed air, the aerated water flows over the electrode. With this embodiment of the invention, aerated water flows from the base of the members toward the tip such that new reactant is continuously flowing from an environment having a low level of electrokinetic activity to an area of intense kinetic activity around or above the points of the m embers. It will be recognized that further embodiments of the electrode may be adapted such that reactant is capable of flowing from the tip of the members toward the base.

The electrode may further comprise a gas diffusing means. The gas diffusing means preferably includes one or more substrates positioned so as to be downstream of the supply of gas when communicating therewith, and upstream of the electrode. The one or more substrates are preferably configured and positioned to provide nucleation sites for formation of fine bubbles when contacted with the gas pumped into the water. Accordingly, when the gas flows past and around the substrates, the fine bubbles of gas form on the members. It has been found that the use of a device having both capabilities (i.e. capable of diffusing a gas, and also providing nucleation sites) leads to an increase in gas diffusion or (when the gas is oxygen) oxygen redox levels. The increase in oxygen redox levels may be the result of, or may manifest in an increase in the levels of oxygen radical(s) in the solution under treatment. In some cases, use of a device having both electrode and diffuser capabilities leads to increases in gas diffusion and/or oxygen redox levels. Additionally or alternatively to the foregoing advantages, use of the device is further capable of increasing gas diffusion and/or oxygen redox levels while having no effect, or a minor effect, on flow rate.

As will be readily understood by the skilled person, in some forms of the gas may be a reducing gas (such as CO or $H_2S$).

In one form of the invention the electrode is also the gas diffusing means. For example, under certain conditions fine bubbles form on the surface of the electrode and may provide the advantageous described supra.

In one embodiment of the invention, the electrode comprises a substantially spherical body disposed on or around a point of a member. As used herein, the term "substantially spherical" is to be construed broadly to include members that are orbicular, ovoid, globular, drop-shaped, and the like. Without wishing to be limited by theory in any way, it is proposed that addition of the substantially spherical portion to the electrode facilitates the reduction of metal ions at the surface of the electrode ("plating out") by providing the electrons required for reduction. Sufficient electrons for plating out may not be provided by a member, and furthermore sufficient surface area for the deposition of metal may not be available with the member alone. Thus, embodiments of the electrode comprising a spherical body are useful in the context of electro winning.

The substantially spherical body may also he capable of regulating a characteristic of the current gradient about a member. In some applications of the electrode, it may be useful to alter a parameter of the gradient such as the strength, slope, or physical size.

Without wising to be limited by theory, it is proposed that electricity is not evenly distributed over the surface of an electrode. An exception to this principle occurs in the case of a perfect sphere, where distribution is absolutely even. Where a less than perfect sphere is under consideration while charge distribution may not be absolutely even, the distribution will none the less be more even than over a surface that includes elements such corners, edges, creases, sharp curves, protuberances and the like where higher charge densities manifest. The avoidance of such elements may provide more even plating out of precipitated product on the surface of the electrode.

By altering the shape or radius of the substantially spherical body, or the location of attachment of the body on the electrode it will be possible by routine experimentation alone to provide a desired alteration to the current gradient.

Embodiments comprising the spherical body are typically applicable in embodiments of the invention where the member is substantially 3 dimensional, such as pyramidal. Electrodes comprising a spherical body may be composed of the same material, or different materials to the member, but may also be of unitary construction. Where the construction is not unitary, sufficient electrical conductance between the member and the spherical body is to be ensured, in one embodiment of the electrode the spherical body is disposed with respect to the point of the member such that it covers or otherwise interferes with the point (or the space about the point) as little as possible.

The electrode may be composed of any suitable electrically conductive material. Exemplary materials include metals and alloys such as stainless steel, platinum, silver, nickel (including MP35N), palladium, aluminum, titanium, copper, iron, brass, bronze, zinc, and tin. A preferred material is stainless steel, mainly due to the corrosion-resistant properties and cost of this alloy. Other exemplary materials that are non-metallic include conductive carbon and semiconductors such as silicon materials. The skilled person is familiar with a range of other suitable materials, with no more than routine experimentation being required to assess suitability for use in the electrodes of the present invention.

In one embodiment of the invention the electrode Is fabricated from a sheet material such as stainless steel. The steel may be cut to produce a plurality of members that extend from the surface of the sheet metal. Each member may be formed, for example, by cutting two sides or a triangular shape and then pushing the so-formed member such that it extends above or below the plane of the sheet metal. The cuts may be made wholly within the boundary of the sheet material, or cuts may extend to the edge of the sheet material. Preferably, all members extend above or below the plane of the sheet metal. Similarly, a member may be formed by cutting 3 sides of a square or rectangle in the sheet metal and then pushing the so-formed member (having two points in this embodiment) above or below the plane of the sheet metal.

In a particularly preferred form of the electrode, the sheet metal is cut radially, in a spoke-like pattern, with the so-formed members being pushed above or below the plane of the sheet metal. In this embodiment, an aperture is created in the plate like material, the aperture being surrounded by the plurality of members such that the liquid or gas under-treatment may be passed through the electrode and contacted with the plurality of members after passing through the aperture. Given the relatively simple construction of some embodiments of the electrodes, significant decreases in capital expenditure can be achieved, and especially in the area of water treatment where expenditure may be decreased by as much as 50%. The simple construction may also decrease maintenance costs by as much as 90%.

An electrode having greater bulk may be formed by way of a casting, or forging method. Generally, these methods are used to provide an electrode of a unitary construction. However, in some forms of the device, the body of the electrode and the members are cast or forged separately, with the components being subsequently assembled in a manner ensuring electrical conductivity between the component parts. The electrodes of the present invention may also be manufactured by a machining process. Typically, the body of the electrode and the members are machined separately, and subsequently assembled.

Electrodes of the present invention may be used alone, or may be associated In the form of an electrode array. Electrode arrays may comprise at least about 2, 3, 4, 5, 6, 7, 8, 9, 10, 15, 20, 25, 30, 35, 40, 45, 50, 100, 200, 300, 400 or 500 electrodes, Electrodes in an array may be connected electrically in series or parallel.

In another aspect the present invention provides a method of manufacturing an electrode, the method comprising the steps of providing an electrically conductive sheet material, cutting the sheet material to provide a plurality of tabs, and directing the tabs so the tabs are directed above or below the plane of the conductive sheet material to provide a plurality of members.

in a preferred embodiment of the method, the electrically conductive sheet material is cut radially, resulting in a series of spoke-like cuts. This forms a plurality of triangular tabs which are then directed above or below the plane of the conductive sheet material to provide a plurality of members. The cutting step may be undertaken by any suitable method, but in a preferred form of the method the cutting is laser cutting. As will be understood, advantage will be gained where the number of spoke-like cuts is greatest given that a greater number of members will be produced. The cuts may be effected to provide any type of member as described herein.

in another aspect, the present invention provides a fluid treatment method, the method comprising the steps of providing a fluid in need of treatment, and exposing the fluid to an electrode described herein for a period of time and under conditions suitable for at least partial treatment of the fluid.

The electrodes described herein are useful for the treatment of any fluids including aqueous, and substantially aqueous liquids. The devices will also find use in the treatment of non-aqueous liquids such as organic solvents (such as I acetic acid, acetonitrile, benzene, 1-butanol, 2-butanol, 2-butanone, t-butyl alcohol, carbontetrachloride, chlorobenzene, chloroform, cyclohexane, 1,2-dichloroethane, diethyl ether diethylene glycol, diglyme (diethylene glycoldimethyl ether), 1,2-dimethoxy-ethane (glyme, DME) dimethylether, dimethyl-formamide (DMF), dimethyl sulfoxide (DMSO), dioxane, ethanol, ethyl acetate, ethylene glycol, glycerine, heptane, Hexamethylphosphoramide (HMPA), Hexamethylphosphorous triamide (HMPT), hexane, methanol, methyl t-butyl ether (MTBE), methylene chloride, N-methyl-2-pyrroiidinone (NMP), nitromethane, pentane. Petroleum ether (ligroine). 1-propanol, 2-propanol, pyridine, tetrahydrofuran (THF), toluene, triethyl amine, heavy $D_2O$, o-xylene, m-xylene, p-xylene), and inorganic solvents (such as liquid ammonia, liquid sulfur dioxide, sulfuryl chloride and sulfuryl chloride fluoride, phosphoryl chloride, dinitrogen tetroxide, antimony trichloride, bromine pentafluoride, hydrogen fluoride, pure sulfuric acid and other inorganic acids).

In some embodiments the fluid is a gas, with the aim of the method being to treat the gas. In these embodiments, the electrolyte may be an aqueous, substantially aqueous or non-aqueous liquid and may be a chemical reactant involved in the treatment of the gas.

The electrodes are also contemplated to be useful in the treatment of fluids such as molten species, such as elemental metals salts of metals and alloys. The electrodes may further be useful in the treatment of fluids such as a gas, a liquefied gas, a vapor, or a plasma.

In one embodiment, the liquid is an aqueous or substantially aqueous liquid. The skilled person is capable of utilizing any of the electrodes disclosed herein in a water treatment method, and will be able to identify suitable conditions and treatment periods for a given application. For example, the method may be performed under constant voltage conditions with current being varied to provide a predetermined voltage. Alternatively, the method may be performed under constant current conditions with voltage being varied to provide a predetermined current, In another embodiment, the method is performed under constant power conditions, with current and/or voltage being set or manipulated to provide a predetermined power.

The voltage may be selected from the group consisting of at least about 1, 2, 3, 4, 5, 6, 7, 8, 9, 10, 15, 20, 25, 50, 75, 100, 250, 500, 750, 1000, 10000, 20000, 30000, 40000, 50000, 60000, 70000, 80000, 90000, and 100000 volts. The electric field may be applied for a period selected from the group consisting of at least about 1, 2, 3, 4, 5, 6, 7, 8, 9, 10, 15, 20, 25, 50, 75, 100, 250, 500, 750 and 1000 minutes, or 1, 2, 3, 4, 5, 6, 7, 8, 9, 10, 11, 12, 13, 14, 15, 20, 25 and 30 days, or 1, 2, 3, 4, 5, 6, 7, 8, 9, 10, 11 and 12 months. It is emphasized that the electric field may or may not be applied continuously for any period, and may be switched on or off for periods of time. It is also emphasized that voltage (or indeed any other parameter) may be varied over the course of any duration. Representative, non-limiting voltages are between about 10 and 20 volts with currents of around 1 to 1000 milliamps, preferably 10 to 250 milliamps. Some applications (such as electrowinning) will require significantly higher currents, such as at least 100, 200, 300, 400 or 500 amps. Typically, greater voltage or current or power will be required where the anode and the cathode are separated by a larger distance, or where any other significant electrical resistance is encountered, it should be noted at this point that a further advantage of the present electrodes is that electricity consumption may be dramatically reduced. In some embodiments of the invention, reductions of around 80% are achievable as compared to contrivances of the prior art.

Treatment times can be varied according to the volume of the liquid to be treated (for example, in a pond environment) or the flow rate of liquid (for example in a continuous flow environment).

As will be appreciated, the electrodes and methods described herein may be used for the treatment of impurity-containing water. Environments where the present electrodes, methods and systems may be used include large scale, such as water reservoirs, ponds, lakes and sewage treatment plants to the small scale such as domestic septic tank systems, water tanks, ponds and pools. In all of these applications, the aim of the treatment process may be to remove or neutralize organic contaminants, such as plant or animal derived matter, sewage and pathogens, or inorganic impurities, including metal ions, phosphates and nitrates. The measurement of water quality arising from the treatment include total suspended solids (TSS), biological oxygen demand (BOD), total nitrogen (TN), total coliform, dissolved oxygen (DO) and concentration of inorganic species.

Electrochemical oxidation has been shown to be feasible for many organic contaminants (see for example Journal of Applied Electrochemistry 21 (1991) 99-104, Electrochemical Waste Water Treatment using High Overvoltage Anodes, Part II: Anode Performance and Applications, and the Table 1 infra for examples).

TABLE 1

| ORGANIC COMPOUND | EOI | ORGANIC COMPOUND | EOI |
| --- | --- | --- | --- |
| Ethanol | 0.49 | Phenol | 0.60 |
| Acetone | 0.21 | Aniline | 0.43 |
| Acetic Acid | 0.09 | Benzenesulphonic Acid | 0.28 |
| Formic Acid | 0.05 | 5-Methyl-3-amino isoxazole | 0.25 |
| Tartaric Acid | 0.34 | Orange II | 0.58 |
| Oxalic Acid | 0.05 | Antracinon Sulphonic Acid | 0.18 |
| Malonic Acid | 0.21 | Nitrobenzene | 0.80 |
| Maleic Acid | 0.21 | Nitrobenzene sulphonic Acid | 0.46 |
| Benzoic Acid | 0.79 | Triaminotriazine | 0.20 |
| Naphthalene-2-sulphonic Acid | 0.51 | EDTA | 0.30 |
| Naphthalene-2-sulphonic Acid | 0.41 | p-NMDA | 0.37 |
| 4-Chlorphenol | 0.35 | | |

The electrochemical oxidation index (EO!) of the Table relates to the oxygen produced in the presence of an organic divided by the oxygen produced without the organic. The index measures the portion of electrons that oxidize the organic.

Thus, the present methods can provide an alternative method for organic removal versus biological treatment methods. The present methods are especially advantageous for organic compounds that are particularly toxic, and therefore not amenable to degradation by biological methods, or require a very long time to be broken down by bacteria.

The present methods are also viable alternatives for organic removal versus adsorption techniques such as activated carbon where the disposal or regeneration of the adsorbent is expensive or creates future environmental liability.

It is contemplated that in order to achieve any desired water quality the present methods may be used in conjunction with treatment methods known in the art including filtration (such as sand, activated carbon, size exclusion membranes, lava), ultrafiltration, sedimentation, activated sludge treatment, ultraviolet light illumination, ozonation, chlorination, fluoridation, reverse osmosis, distillation, acidification, alkalinization, coagulation, flocculation, electrodeionization, dialysis, and electrodialysis.

The electrode of the invention is particularly useful in the treatment of waste water, particularly in the presence of an introduced oxidant. More particularly, the electrode is applicable for use as the first electrode in the method of the invention when used in a reticulated waste water treatment system such as a sewage treatment system. The reticulated waste water treatment system is preferably one including a number of chambers, for staged purification of water. Such chambers typically include a primary or anaerobic chamber a secondary or aerobic chamber and a tertiary or clarification chamber. The electrode of the invention can be provided in at least one of those chambers, and preferably in all except the primary (anaerobic) chambers. In this arrangement, the electrode is preferably used in conjunction with an introduced oxidant, preferably oxygen. The oxygen is conveniently introduced by aerating the waste water although it may be introduced as oxygen gas. Alternatively, other oxidants, preferably oxidizing gases, such as NO, ozone, or ionized versions of these, may instead be introduced.

In another aspect the present invention provides a method for precipitating an ionic species or gas in solution, the method comprising the steps of providing a solution containing the ionic species or gas, exposing the solution to an electrode described herein for a period of time and under conditions suitable for the complete or partial precipitation of the ionic species or gas. In one embodiment of the method, the electrode comprises a spherical body as described herein. As for methods of water treatment, the skilled person is capable of achieving a desired outcome with regards to the precipitation of a solid or gas from solution by the routine manipulation of variables such as voltage, current, power and treatment time. A representative non-limiting voltage is between about 2 and 5 volts, with currents being around 500 amps. Treatment times can be estimated and/or varied by the application of Faraday's Law which is well known to the skilled artisan as defining the relationship between the amount of substance consumed or produced at one of the electrodes in an electrolytic cell and the amount of electricity that passes through the cell.

These methods of precipitation may be directed to many commonly used industrial processes such as the electrowinning (or electrorefining) of the more reactive metals for example, for aluminum and metals above it in the electrochemical series such as copper. Certain metals are extracted from their ores using electrolysis. For example, aluminum is obtained by passing an electric current through fused bauxite ($Al_2O_3$) and cryolite ($Na_3AlF_6$). Active metals like sodium, calcium and magnesium are also extracted from their ores using electrolysis.

While electrolytic methods for the precipitation of metals can produce very high purity product, the requirement for significant amounts of electrical energy is problematic. It is proposed that an advantage of the present electrodes is that less electrical energy is required to precipitate a given amount of product as compared with electrodes commonly used in the art. In a preferred embodiment of the method, the electrode comprises a spherical body to increase the surface area available for the "plating out" of product.

A further aspect of the present invention is provides a method for altering a biological characteristic of an organism in an aqueous solution, the method comprising the steps of providing an organism in an aqueous solution, and exposing the organism to an electrode as described herein, or an array as described herein for a period of time and under conditions suitable for altering the biological characteristic.

As used herein, the term "biological characteristic" includes any one or more of the following characteristics: (i) growth, including an alteration in any one or more of the following parameters: organism size, organism shape, organism surface area, or organism number, (ii) viability, (iii) the ability to reproduce, (iv) the regulation of cell cycle, (v) the ability to assimilate a nutrient, (vi) the integrity or permeability of a membrane or wall of a cell of the organism, including the ability of the organism to contain or exclude a solute or solvent, (vii) buoyancy, and (viii) motility.

As used herein, the term "altering" is intended to include any change in a biological characteristic that would not have resulted but for the application of the electric field in accordance with the present invention.

In the context of the present method the term "aqueous solution" is intended to include any solution of any solute wherein water is the solvent, or at least the primary solvent. The aqueous solution may be naturally occurring, such as pond water, lake water, river water, creek water, stream water, ocean water, or sea water. The aqueous solution may be artificially created, such as a defined or undefined fermentation broth for the growth of bacteria, or a minimal essential medium for the growth of eukaryotic cells. It is not intended that the aqueous solution have a similar density or viscosity to pure water, and semisolid aqueous solutions (such as gels) are contemplated, for example.

The aqueous solution may be contained artificially by any electrically suitable containment means such as a tank, pipeline, reservoir, dam, an incubation flask, a fermentation chamber, or a bioreactor; or by natural containment means such as that provided by a pond, lake, river, creek, stream, ocean, or sea. The means of containment may be a combination of natural and artificial means, such as a fish pen that is situated in a natural lake.

In one embodiment of the method the biological characteristic is growth of the organism. Inventor has demonstrated that the present methods are capable of improving the growth of algae in an aqueous environment. Accordingly the electrodes described herein will find particular use in the economically important field of algaculture.

The majority of algae that are cultivated fall into the category of microalgae, also referred to as phytoplankton, microphytes, or planktonic algae. Macroalgae, commonly known as seaweed, also have many commercial and industrial uses, but due to their size and the specific requirements of the environment in which they need to grow, they do not lend themselves as readily to cultivation on a large scale as microalgae and are most often harvested wild from the ocean. However, it is nonetheless intended that the present methods are applicable to macroalgae.

When cultivating algae, several factors must be considered, and different algae have different requirements. The water must be in a temperature range that will support the specific algal species being grown. Nutrients must be controlled so algae will not be "starved" and so that nutrients will not be wasted, Light must not be too strong nor too weak.

In one embodiment, the method is carried out for cultivation of wild algae which can be cultured in raceway-type ponds and lakes. The present methods are particularly advantageous in such large-scale situations. The growing season is largely dependent on location and, aside from tropical areas, is typically limited to the warmer months. Improvements in growth as provided by the present methods may allow for a wider variety of environment conditions under which algae may be cultivated. A major benefit to this type of system is that it is one of the cheaper ones to construct, in the very least only a trench or pond needs to be dug. It can also have some of the largest production capacities relative to other systems of comparable size and cost. This type of culture can be viable when the particular algae in question requires (or is able to survive) some sort of extreme condition that other algae cannot survive. For instance, *Spirulina* sp. can grow in water with a high concentration of sodium bicarbonate and *Dunaliela salina* will grow in extremely salty water. Open culture can also work if there is a simple inexpensive system of selecting out the desired algae for use and to inoculate new ponds with a high starting concentration of the desired algae. Some chain diatoms fall into this category as they can be filtered from a stream of water flowing through an outflow pipe. A "pillow case" of a fine mesh cloth is tied over the outflow pipe and most algae flow right through. The chain diatoms are held in the bag and used to feed shrimp larvae (in Eastern hatcheries) and to inoculate new tanks or ponds.

A variation on the basic "open-pond" system is to close it off, to cover a pond or pool with a greenhouse. While this usually results in a smaller system, for economic reasons, it does take care of many of the problems associated with an open system. It allows more species to be grown, it allows the species that are being grown to stay dominant, and it extends the growing season, only slightly if unheated, and if heated it can produce year round.

Algae can also be grown in a photo bioreactor. A photo bioreactor is a bioreactor which incorporates some type of light source. Virtually any translucent container could be called a photo bioreactor, however the term is more commonly used to define a closed system, as opposed to an open tank or pond. Because these systems are closed, all essential nutrients must be introduced into the system to allow algae to grow and he cultivated. Essential nutrients include carbon dioxide, water, minerals and light. A pond covered with a greenhouse could be considered a photo bioreactor. A photo bioreactor can be operated in "batch mode" but it is also possible to introduce a continuous stream of sterilized water containing nutrients, air, and carbon dioxide. As the algae grow, excess culture overflows and is harvested. If sufficient care is not taken, continuous bioreactors often collapse very quickly, however once they are successfully started, they can continue operating for long periods. An advantage of this type of algae culture is that algae in the "log phase" is produced which is generally of higher nutrient content than old "senescent" algae. It can be shown that the maximum productivity for a bioreactor occurs when the "exchange rate" (time to exchange one volume of liquid) is equal to the "doubling time" (in mass or volume) of the algae.

While algae is often grown in monocultures using microbiological techniques to purify the desired strain, another approach has been used very successfully to produce algae feed for the cultivation of a variety of mollusks. Sea water is passed through filters to remove algae which are too large for the larvae being cultivated. Tanks in a green house, sometimes on a balcony in the mollusk house, are filled with the partially filtered water and nutrients are added. The tanks may be aerated and the water is used after only a day or two of growing. The resulting thin soup of mixed algae has been shown to be an excellent food source for larval mollusks. An advantage of this method of algaculture is the low maintenance requirements.

The practical advantage of increasing the growth rate of an algal culture is that more algal product is produced per unit time. Thus, a greater volume of product is achievable in a given volume of aqueous solution.

In one embodiment of the method, the biological characteristic is the regulation of the cell cycle. As will be understood by the person of skill in the art, the growth and reproduction of cells follows a predetermined cycle. For many cell types, the cell cycle consists of four distinct phases: G1 phase, S phase, G2 phase (collectively known as interphase) and M phase. M phase is itself composed of two tightly coupled processes: mitosis, in which the cell's chromosomes are divided between the two daughter cells, and cytokinesis, in which the cell's cytoplasm divides forming distinct cells. Activation of each phase is dependent on the proper progression and completion of the previous one. Cells that have temporarily or reversibly stopped dividing are said to have entered a state of quiescence called G0 phase.

The relatively brief M phase consists of nuclear division mitosis) and cytoplasmic division (cytokinesis). In plants and algae, cytokinesis is accompanied by the formation of a new cell wall. The largest of all these processes is (interphase). After M phase, the daughter cells each begin interphase of a new cycle. Although the various stages of interphase are not usually morphologically distinguishable, each phase of the cell cycle has a distinct set of specialized biochemical processes that prepare the cell for initiation of cell division.

The first phase within interphase, from the end of the previous M phase till the beginning of DNA synthesis is called G1 (G indicating gap or growth). During this phase the biosynthetic activities of the cell, which had been considerably slowed down during M phase, resume at a high rate. This phase is marked by synthesis of various enzymes that are required in S phase, mainly those needed for DNA replication. Duration of G1 is highly variable, even among different cells of the same species.

The ensuing S phase starts when DNA synthesis commences; when it is complete, all of the chromosomes have been replicated, i.e., each chromosome has two (sister) chromatids. Thus, during this phase, the amount of DNA in the cell has effectively doubled, though the ploidy of the cell remains the same. Rates of RNA transcription and protein synthesis are very low during this phase. An exception to this is histone production, most of which occurs during the S phase. The duration of S phase is relatively constant among cells of the same species.

The cell then enters the G2 phase, which lasts until the cell enters mitosis. Again, significant protein synthesis occurs during this phase, mainly involving the production of microtubules, which are required during the process of mitosis. Inhibition of protein synthesis during G2 phase prevents the ceil from undergoing mitosis.

The term "post-mitotic" is sometimes used to refer to both quiescent and senescent cells. Nonproliferative cells in multicellular eukaryotes generally enter the quiescent G0 state from G1 and may remain quiescent for long periods of time, possibly indefinitely (as is often the case for neurons). This is very common for cells that are fully differentiated. Cellular senescence is a state that occurs in response to DNA damage or degradation that would make a cell's progeny nonviable; it is often a biochemical alternative to the self-destruction of such a damaged cell by apoptosis. Some cell types in mature organisms, such as parenchymal cells of the liver and kidney, enter the G0 phase semi-permanently and can only be induced to begin dividing again under very specific circumstances; other types, such as epithelial cells, continue to divide throughout an organism's life.

Thus, the methods of the present invention may act to synchronize cells at any one of any of the aforementioned stages or phases.

While the above passage is of general applicability, the present methods in some embodiments pertain to particular organisms. For example, the growth of bacteria involves the division of one bacterium into two identical daughter cells during a process called binary fission. Hence, local doubling of the bacterial population occurs. Both daughter cells from the division do not necessarily survive. However, if the number surviving exceeds unity on average, the bacterial population undergoes exponential growth. The measurement of an exponential bacterial growth curve in batch culture was traditionally a part of the training of all microbiologists; the basic means requires bacterial enumeration (cell counting) by direct and individual (microscopic, flow cytometry), direct and bulk (biomass), indirect and individual (colony counting), or indirect and bulk (most probable number, turbidity, nutrient uptake) methods.

In autecological studies, bacterial growth in batch culture can be modeled with four different phases: lag phase (A), exponential or log phase (B), stationary phase (C), and death phase (D). During lag phase, bacteria adapt themselves to growth conditions, it is the period where the individual bacteria are maturing and not yet able to divide.

During the exponential phase (sometimes called the log phase), the number of new bacteria appearing per unit time is proportional to the present population. This gives rise to the classic exponential growth curve, in which the logarithm of the population density rises linearly with time. The actual rate of this growth depends upon the growth conditions, which affect the frequency of cell division events and the probability of both daughter cells surviving. Exponential growth cannot continue indefinitely, however, because the medium is soon depleted of nutrients and enriched with wastes.

During stationary phase, the growth rate slows as a result of nutrient depletion and accumulation of toxic products. This phase is reached as the bacteria begin to exhaust the resources that are available to them. At death phase bacteria run out of nutrients and die.

Thus, the methods of the present invention may act to synchronize bacterial cells at any one of any of the aforementioned stages or phases.

This basic batch culture growth model draws out and emphasizes aspects of bacterial growth which may differ from the growth of macrofauna. It emphasizes clonality, asexual binary division, the short development time relative to replication itself, the seemingly low death rate, the need to move from a dormant state to a reproductive state or to condition the media, and finally, the tendency of lab adapted strains to exhaust their nutrients.

Batch culture is the most common laboratory growth environment in which bacterial growth is studied, but it is only one of many, it is ideally spatially unstructured and temporally structured. The bacterial culture is incubated in a closed vessel with a single batch of medium. In some experimental regimes, some of the bacterial culture is periodically removed to afresh sterile media is added. In the extreme case, this leads to the continual renewal of the nutrients. This is a chemostat also known as continuous culture. It is ideally spatially unstructured and temporally unstructured, in an equilibrium state defined by the nutrient supply rate and the reaction of the bacteria. In comparison to batch culture, bacteria are maintained in exponential growth phase and the grow growth rate of the bacteria is known. Related devices include turbidostats and auxostats.

Cell cycles can include events specific to certain genera or species of organism. For example, some species of alga include a sporulation step. This is the most common form of asexual reproduction in the algae. Sporulation refers to the process in which any cell of an organism produces one or more reproductive cells inside its cell walls. The original cell is termed a sporangium and the new cells are termed spores. Spores are often produced in large numbers for the rapid increase in population size. Inventor has demonstrated herein the ability of the present methods to synchronize the cell cycles of a population of algal cells, such that sporulation (or "ripening") can be synchronized across the members of the population. The practical advantage of synchronizing ripening is the ability to harvest the entire population of algae at their optimal productive stage.

In one embodiment of the method the biological characteristic is the integrity or permeability of a membrane or wall of a cell of the organism, including the ability of the organism to contain, exclude, admit or expel a solute or solvent.

The alteration of permeability may be useful for facilitating the entry of solutes into, or exit of solutes from, the cell of an aqueous organism by the process of electroporation (also known as electropermeabilization). This process is usually used in molecular biology as a way of introducing some substance into a cell, such as loading it with a molecular probe, a drug that can change the cell's function, or a piece of coding DNA. However, the method may be used on a larger scale, such as a bioreactor for the growth of bacteria.

Pores are formed when the voltage across a plasma membrane exceeds its dielectric strength. If the strength of the applied electrical field and/or duration of exposure to it are properly chosen, the pores formed by the electrical pulse reseal after a short period of time, during which extracellular compounds have a chance to enter into the cell. Excessive exposure of live cells to electrical fields can cause apoptosis and/or necrosis—the processes that result in cell death.

In molecular biology, the process of electroporation is often used for the transformation of bacteria, yeast, and plant protoplasts, in addition to the lipid membranes, bacteria also have cell walls which are different from the lipid membranes and are made of peptidoglycan and its derivatives. However, the wails are naturally porous and only act as stiff shells that protect bacteria from severe environmental impacts. If bacteria and plasmids are mixed together, the plasmids can be transferred into the cell after electroporation.

This procedure is also highly efficient for the introduction of foreign genes in tissue culture cells, especially mammalian cells. For example, it is used in the process of producing knockout mice, as well as in tumor treatment, gene therapy, and cell-based therapy. The process of introducing foreign DNAs into eukaryotic cells is known as transfection.

The biological characteristic of buoyancy may be related to the integrity or permeability of a membrane or cell wall, given that these structures may act to regulate intracellular concentrations of salt, water, protein, fat, oil and gas. Alterations in buoyancy may be used practically to assist in the harvesting of aquatic organisms. For example, were buoyancy is increased, the organism will float to the surface of the aqueous solution, and may be conveniently scooped from the surface using a net, screen or similar contrivance.

Conversely, where buoyancy is decreased the organism will sink to the bottom of the aqueous solution. The supernatant may then be siphoned away, leaving the concentrated organism for harvesting.

As discussed above, the present invention provides the ability to alter a biological characteristic of an organism. It will be appreciated that the invention is not limited to alterations that are necessarily positive to the overall health of the organism. For example, the present invention may still be useful where it is desired to inhibit the growth of an organism. Buoyancy of a photosynthetic organism may be decreased such that it is exposed to lower levels of light, thereby leading to a decreased growth rate. Where it is desired to completely kill an organism, the voltage may be applied such that the cell(s) of the organism are completely lysed, or further replication is substantially inhibited. Example 8 herein demonstrates significant reduction in $E.\ coli$ and faecal coliform counts using the electrodes of the present invention.

In the methods of the present invention, the electrode may be used as either an anode or a cathode. As the skilled person understands, an electrolytic cell requires a first electrode and a second electrode. Where the first electrode is a cathode the second electrode is an anode and vice-versa. When driven by an external voltage applied across the cathode and anode, the electrolyte provides ions that flow to and from the electrodes, where charge-transferring, or faradaic, or redox reactions can take place. In one embodiment, the electrode is used as a cathode. One reason that a cathodic electrode is preferred is because most inorganic contaminants are cationic (especially metal ions) meaning that cations will migrate to the cathode and may undergo half-cell reactions and/or precipitation as salts thereby removing them from solution.

Furthermore, the stability of common electrode materials is greater under cathodic, rather than anodic, conditions. Many common electrode metals would be susceptible to oxidation (galvanic corrosion) under anodic conditions, which may further contaminate the water with hydroxides of the anode metal. Accordingly, where the electrode is anodic, it is preferably made from oxidation resistant material, such as platinum or carbon.

In the methods of the present invention, the electrode may or may not be connected to an electric current. Where no current is applied, the electrolytic reaction may proceed spontaneously due to innate redox potential differences. Furthermore, it will be understood that any of the methods disclosed herein may utilize the electrode in a full-cell or half-cell reaction.

In another aspect the present invention provides a system for treating a liquid or gas comprising use of an electrode and/or any method described herein. For the treatment of waste water, the system may comprise of an electrolyzer, holding tanks, pumps, flow monitors, valves and control units. The electrolyzer may be an open tank containing any appropriate number of electrodes.

The present invention will now be more fully described by reference to the following non-limiting Examples.

EXAMPLE 1

Manufacture of an Electrode from Sheet Metal 16 mm stainless steel was cut with an industrial carbon dioxide laser focused to a diameter of 0.1 mm, For the purposes of the experiments detailed in Examples 2 to 8 herein, radial cuts as per the template shown in FIG. 1A were used. The number of radial cuts varied according to the number of members required for the electrode. For example, where 18 members were required, 16 radial cuts were made.

After laser cutting, a force was applied to the center of the sheet metal to bend the cui metal such that the points were directed in generally perpendicular direction with respect to the plane of the sheet metal.

EXAMPLE 2

Demonstration of Relationship Between Number of Members on an Electrode and Dissolved Oxygen Content of Water Testing of electrodes was conducted in an outdoor tank having a reticulation loop of 4800 liters. Water temperature for replicate experiments varied by no more than 2 degrees Celsius. Before each experiment, water was depleted of dissolved oxygen, down to a level of 0 to 0.5 ppm.

All electrodes were tested in the same airlift housing of 100 mm diameter and 1200 length. Air was injected at a rate of 110 liters/min, with hydraulic flow set at 90 liters/min Each replicate experiment was run for 24 hours, at a potential of 9V and current of 12 mA.

Table 2 shows that dissolved oxygen content is directly proportional to the number of members on the electrode. The performance of electrodes having 2 members (a simple rod electrode), and 8 members is compared with electrodes having 64, 128 and 256 members. The data of Table 2 is presented graphically in FIG. 3.

TABLE 2

| Members | Electrode | Actual DO | Predicted DO |
|---------|-----------|-----------|--------------|
| 2 (rod) | E1 | 3.0 | 3.0 |
| 8 (disc) | E2 | 4.5 | 4.3 |
| 64 | E16 | 6.2 | 6.4 |
| 128 | E32 | 7.0 | 7.1 |
| 256 | E64 | 8.2 | 7.8 |

Figure 3:
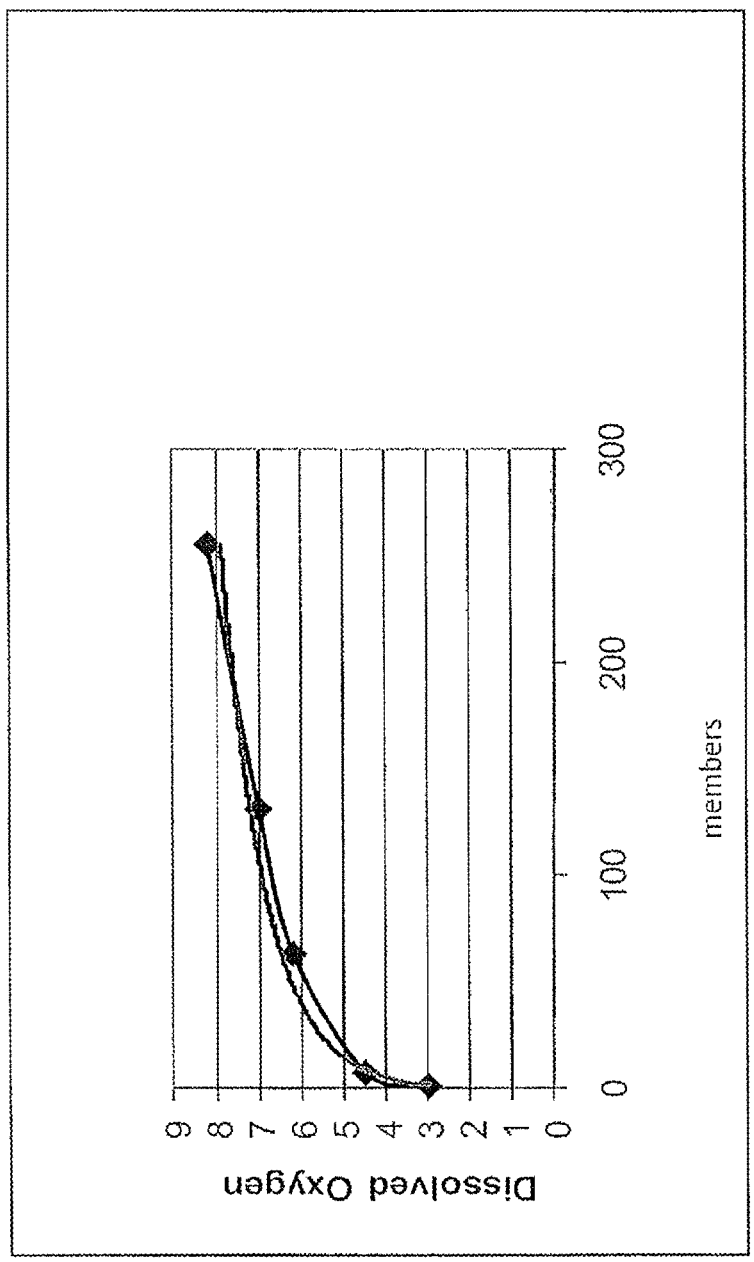
FIG. 3 shows a graph describing the relationship between number of members on an electrode and dissolved oxygen content of water.

It will be noted from FIG. 3 that no plateau in dissolved oxygen level is reached, and on that basis it could be reasonably predicted that use of electrodes having more than 192 members will provide even greater dissolved oxygen levels. To this end, Applicant proposes that a general formula $y = m \ln(x) + c$ be used to described the curve of FIG. 3, The curve that fits current data is calculated to be $y = 1.0089 \ln(x) + 2.2842$. With extrapolation, the formula predicts significant increases in dissolved oxygen as follows (Table 3):

TABLE 3

| Members | Predicted DO (ppm) |
|---------|---------------------|
| 256 | 7.8 |
| 600 | 8.7 |
| 2000 | 9.9 |
| 6000 | 11.0 |
| 20000 | 12.2 |
| 60000 | 13.3 |

These predictions may be subject to any applicable saturation limit of the liquid under treatment. At normal ambient temperatures, water has a saturation limit of 8 to 9 ppm. However it is to be appreciated that the present invention may be capable of supersaturating water with respect to dissolved oxygen

EXAMPLE 3

Effect of Current on Gain in Dissolved Oxygen Level

Testing of an electrode having 32 members was conducted in an outdoor tank having a reticulation loop of 4800 liters. Water temperature for replicate experiments varied by no more than 2 degrees. Before each experiment, water was depleted of dissolved oxygen down to a level of 0 to 0.5 ppm.

The electrode was disposed in an airlift housing of 100 mm diameter and 1200 mm length was used. Air was injected at a rate of 110 liters/min, with hydraulic flow set at 90 liters/min. Each replicate experiment was run for 24 hours, at a potential of 9V and current of 12 mA.

Figure 4:
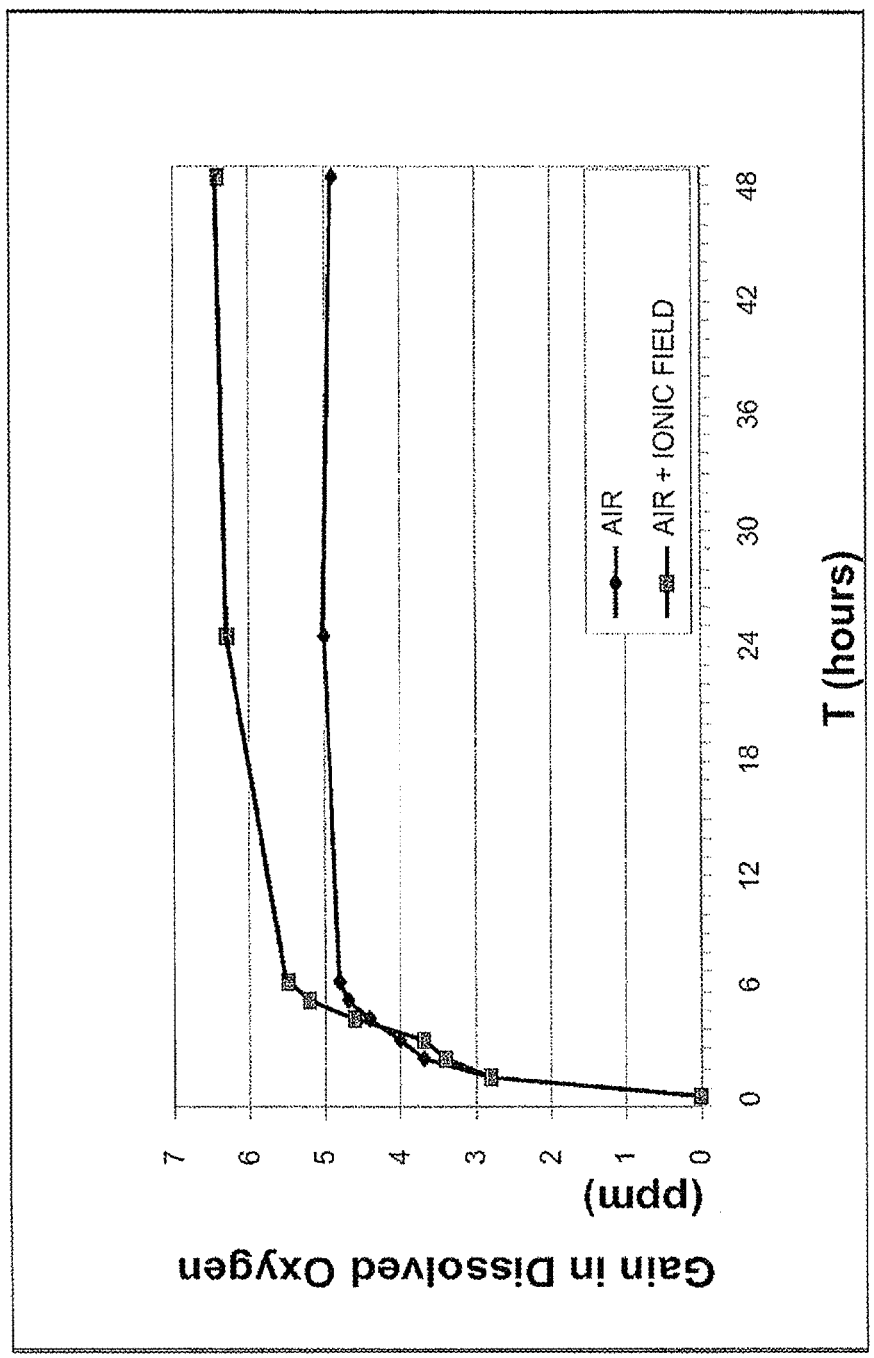
FIG. 4 shows a graph describing the effect of applying an electrical current to the electrode on gain in dissolved oxygen level.

It will be noted from FIG. 4 that application of current has a definite effect on the level of dissolved oxygen achievable after 48 hours treatment time. It will be further noted that levels of dissolved oxygen were still increasing at 48 hours where current is applied, while a peak was noted around 24 hours for the air only treatment.

EXAMPLE 4

Comparison with Dissolved Oxygen Levels with Industry Standard System

An electrode having 16, 32 or 84 members produced according to the method described in Example 1 was used to treat waste water as described in Example 2. Samples were assayed for dissolved oxygen, with the results shown in FIG. 5. It will be noted that for the 18, 32 and 84 point electrodes, dissolved oxygen levels are higher than for the industry standard of 6 ppm. It will be further noted that an increase in the number of members results in an increase in dissolved oxygen level.

EXAMPLE 5

Acceleration of Algal Growth

The experiment was conducted in an outdoor tank having a reticulation loop of 4800 liters. An electrode having 18 members was disposed in an airlift housing of 100 mm diameter and 1200 length. Air was injected at a rate of 110 liters/min, with hydraulic flow set at 90 liters/min. A potential of 9V (12 mA) was applied to the system. Over a period of weeks, fungal growth was noted to be greatly accelerated in the vicinity of the airlift/electrode, with some growths exhibiting an elongate morphology. By comparison, fungal growth away from the airlift electrode was sparse, and of a regular morphology.

An example of a fungal growth produced is shown in FIG. 6. Brown algae grow in aeration systems typically grow to sizes between 5 mm and 10 mm. By contrast the colony shown in FIG. 6 is 140 mm long and 40 mm wide.

EXAMPLE 6

Effect of Current on Faecal Coliforms

Experimental conditions were identical to those described for Example 5 herein.

Samples of water were taken at regular intervals and assayed for total faecal coliforms, *E. Coli* (as an indicator of faecal contamination) biochemical oxygen demand (BOD) and total suspended solids (TSS). A II assays were performed by IANZ accredited test by NZLabs (Hastings, New Zealand) (Table 4).

TABLE 4

| Time | BOD (mg/L) | *E. Coli* (cfu/mL) | Feacal Coliform Count (cfu/mL) | TSS (mg/L) |
| --- | --- | --- | --- | --- |
| Week 1 | 31 | NT | 380 | 18 |
| Week 2 | NT | NT | NT | NT |
| Week 3 | 45 | 0.51 | 7.5 | 15 |
| Week 4 | 20 | 0.17 | 7.6 | 3.7 |
| Week 5 | 14 | 0.43 | 0.51 | 17 |

(NT = not tested: cfu = colony forming units)

It will be noted that between weeks 1 and 3, a 50-fold (1.9 log) reduction in total faecal coliform count is effected by the electrolysis method. Between weeks 1 and 5 a 745-fold (2.9 log) reduction in coliform count was achieved. These results compare favorably to existing water treatment methods that are capable of achieving reductions of faecal coliform counts down to the range 30 to 300 cfu/mL As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electrode for a half cell for transferring a charge comprising:
   a) an electrically conductive sheet material being cut into a plurality of tabs of regular morphology to form a plurality of members, wherein each member comprises a base attached to the sheet material, and a tip at a most distal point of the member from the base, wherein each member tapers from the base of the member to the corresponding tip of the same member to form a triangle, wherein each tip has a cross-sectional area defined by the intersection of the tip with a corresponding plane which is tangent to the individual tip, and wherein the cross-sectional area of each tip is less than that of a cylindrical wire of gauge of about 0000000;
   b) the plurality of members having regular morphology are arranged in a fashion wherein each member is pushed to extend above or below a plane of the sheet material; and
   c) the plurality of members are used for making an electrical contact with an electrolyte, wherein the electrolyte flows continuously from the base of each member toward the corresponding tip of each triangle, wherein each base has a lower electrokinetic activity than each corresponding tip;
   wherein the electrode is a half cell electrode.

2. The electrode according to claim 1, comprising at least 4 members.

3. The electrode according to claim 1, comprising less than about $10^3$ members.

4. The electrode according to claim 1, further comprising a wire or a cable as an electrical conduit.

5. An array of electrodes according to claim 1.

* * * * *